United States Patent
Liao

(10) Patent No.: US 10,382,803 B2
(45) Date of Patent: Aug. 13, 2019

(54) DISPLAY DEVICE AND SIGNAL SOURCE SWITCHING METHOD

(71) Applicant: QISDA CORPORATION, Taoyuan (TW)

(72) Inventor: Chien-Nan Liao, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 6 days.

(21) Appl. No.: 15/782,855

(22) Filed: Oct. 13, 2017

(65) Prior Publication Data

US 2019/0075338 A1  Mar. 7, 2019

(30) Foreign Application Priority Data

Sep. 6, 2017  (CN) .......................... 2017 1 0794424

(51) Int. Cl.
| | |
|---|---|
| *G06F 13/40* | (2006.01) |
| *H04N 21/23* | (2011.01) |
| *H04N 21/2389* | (2011.01) |
| *H04N 21/2368* | (2011.01) |

(52) U.S. Cl.
CPC ..... *H04N 21/2389* (2013.01); *H04N 21/2368* (2013.01); *H04N 2201/0051* (2013.01)

(58) Field of Classification Search
CPC ..... G06F 13/4022; G06F 13/4282; G06F 3/14
See application file for complete search history.

(56) References Cited

U.S. PATENT DOCUMENTS

| | | | | |
|---|---|---|---|---|
| 9,710,406 B2 * | 7/2017 | Pethe | ..................... | G06F 13/102 |
| 9,715,472 B2 * | 7/2017 | Chang | ................. | G06F 13/4282 |
| 9,852,098 B2 * | 12/2017 | Gagne-Keats | .... | H04M 1/72527 |
| 9,952,997 B2 * | 4/2018 | Lee | ...................... | G06F 13/4022 |
| 9,971,719 B2 * | 5/2018 | Pan | ........................ | G06F 13/385 |
| 10,002,105 B2 * | 6/2018 | Chen | ...................... | G06F 13/385 |
| 10,025,351 B2 * | 7/2018 | Ellis | ...................... | G06F 1/1632 |
| 2017/0139871 A1 * | 5/2017 | Yeh | ...................... | G06F 13/4081 |
| 2018/0060270 A1 * | 3/2018 | Schnell | ............... | G06F 13/4282 |
| 2018/0143916 A1 * | 5/2018 | Gupta | ................... | G06F 13/102 |
| 2018/0239732 A1 * | 8/2018 | Yang | ................... | G06F 13/4022 |

FOREIGN PATENT DOCUMENTS

TW  M516187  1/2016

OTHER PUBLICATIONS

Pericom—"PI5USB30216C—Plug-in Detector for Type-C Connector"; 20 Pages, Dated Apr. 11, 2016 (Year: 2016).*
"Universal Serial Buss Type-C Cable and Connector Specification, Release 1.3"—241 Pages, Dated Jul. 14, 2017 (Year: 2017).*

* cited by examiner

*Primary Examiner* — Brian T Misiura

(57) ABSTRACT

A display device includes a USB Type-C connector module, an audio/video signal switching unit, a processing unit, and a display unit. The USB Type-C connector module includes a USB Type-C connector, a configuration channel logic IC, and a channel switching multiplexer. The processing unit selectively reads a channel setting state from one of the configuration channel logic IC and the channel switching multiplexer and determines whether the channel setting state includes an audio/video channel. When the processing unit determines that the channel setting state includes the audio/video channel, the processing unit controls the audio/video switching unit to switch a signal source of the display unit to a signal source of the USB Type-C connector module.

10 Claims, 7 Drawing Sheets

DISPLAY DEVICE AND SIGNAL SOURCE SWITCHING METHOD

BACKGROUND OF THE INVENTION

1. Field of the Invention

The invention relates to a display device and a signal source switching method and, more particularly, to a display device and a signal source switching method capable of switching signal source automatically.

2. Description of the Prior Art

A display device always comprises lots of input connectors with identical or different signal formats, such as audio/video (AV) connector, separate video (S-Video) connector, component video connector, Video Graphics Array (VGA) connector, Digital Visual Interface (DVI) connector, High Definition Multimedia Interface (HDMI) connector, DisplayPort (DP) connector, Universal Serial Bus (USB) Type-C connector, and so on. As the input connector increases, a user has to spend much time to switch a signal source of a display panel to a desired signal source. Currently, the prior art switches the signal source of each input connector one by one, so as to detect whether an active signal exists. However, the aforesaid manner wastes lots of time on detecting inactive signal source. Furthermore, since the USB Type-C connector can transmit power, audio/video signal, and data simultaneously, more and more display devices are equipped with one or more USB Type-C connectors. Accordingly, how to switch signal source effectively for the USB Type-C connector has become a significant issue.

SUMMARY OF THE INVENTION

An objective of the invention is to provide a display device and a signal source switching method capable of switching signal source automatically, so as to solve the aforesaid problems.

According to an embodiment of the invention, a display device comprises a USB Type-C connector module, an audio/video signal switching unit, a processing unit, and a display unit. The USB Type-C connector module comprises a USB Type-C connector, a configuration channel logic IC, and a channel switching multiplexer, wherein the USB Type-C connector is electrically connected to the configuration channel logic IC and the channel switching multiplexer, and the configuration channel logic IC is electrically connected to the channel switching multiplexer. The audio/video signal switching unit is electrically connected to the channel switching multiplexer. The processing unit is electrically connected to the configuration channel logic IC, the channel switching multiplexer, and the audio/video signal switching unit. The display unit is electrically connected to the processing unit. The processing unit selectively reads a channel setting state from one of the configuration channel logic IC and the channel switching multiplexer and determines whether the channel setting state comprises an audio/video channel. When the processing unit determines that the channel setting state comprises the audio/video channel, the processing unit controls the audio/video switching unit to switch a signal source of the display unit to a signal source of the USB Type-C connector module.

According to another embodiment of the invention, a signal source switching method is adapted to a display device. The display device comprises a USB Type-C connector module, an audio/video signal switching unit, and a display unit. The USB Type-C connector module comprises a USB Type-C connector, a configuration channel logic IC, and a channel switching multiplexer. The signal source switching method comprises steps of selectively reading a channel setting state from one of the configuration channel logic IC and the channel switching multiplexer; determining whether the channel setting state comprises an audio/video channel; and when determining that the channel setting state comprises the audio/video channel, controlling the audio/video switching unit to switch a signal source of the display unit to a signal source of the USB Type-C connector module.

According to another embodiment of the invention, a display device comprises a USB Type-C connector module, an audio/video signal switching unit, a processing unit, and a display unit. The USB Type-C connector module comprises a USB Type-C connector and a configuration channel logic IC, wherein the USB Type-C connector is electrically connected to the configuration channel logic IC. The audio/video signal switching unit is electrically connected to the USB Type-C connector. The processing unit is electrically connected to the configuration channel logic IC and the audio/video signal switching unit. The display unit is electrically connected to the processing unit. The processing unit reads a channel setting state from the configuration channel logic IC and determines whether the channel setting state comprises an audio/video channel. When the processing unit determines that the channel setting state comprises the audio/video channel, the processing unit controls the audio/video switching unit to switch a signal source of the display unit to a signal source of the USB Type-C connector module.

According to another embodiment of the invention, a signal source switching method is adapted to a display device. The display device comprises a USB Type-C connector module, an audio/video signal switching unit, and a display unit. The USB Type-C connector module comprises a USB Type-C connector and a configuration channel logic IC. The signal source switching method comprises steps of reading a channel setting state from the configuration channel logic IC; determining whether the channel setting state comprises an audio/video channel; and when determining that the channel setting state comprises the audio/video channel, controlling the audio/video switching unit to switch a signal source of the display unit to a signal source of the USB Type-C connector module.

As mentioned in the above, when an external device is connected to the USB Type-C connector of the display device, the configuration channel logic IC communicates with the external device through a configuration channel pin of the USB Type-C connector, so as to determine the channel setting state. The processing unit may selectively reads the channel setting state from one of the configuration channel logic IC and the channel switching multiplexer and determines whether the channel setting state comprises the audio/video channel. When the processing unit determines that the channel setting state comprises the audio/video channel, the processing unit controls the audio/video switching unit to switch the signal source of the display unit to the signal source of the USB Type-C connector module. Accordingly, the invention can switch the signal source easily and rapidly while the external device is connected to the USB Type-C connector of the display device and the audio/video channel is established.

These and other objectives of the present invention will no doubt become obvious to those of ordinary skill in the art

DETAILED DESCRIPTION

Figure 1:
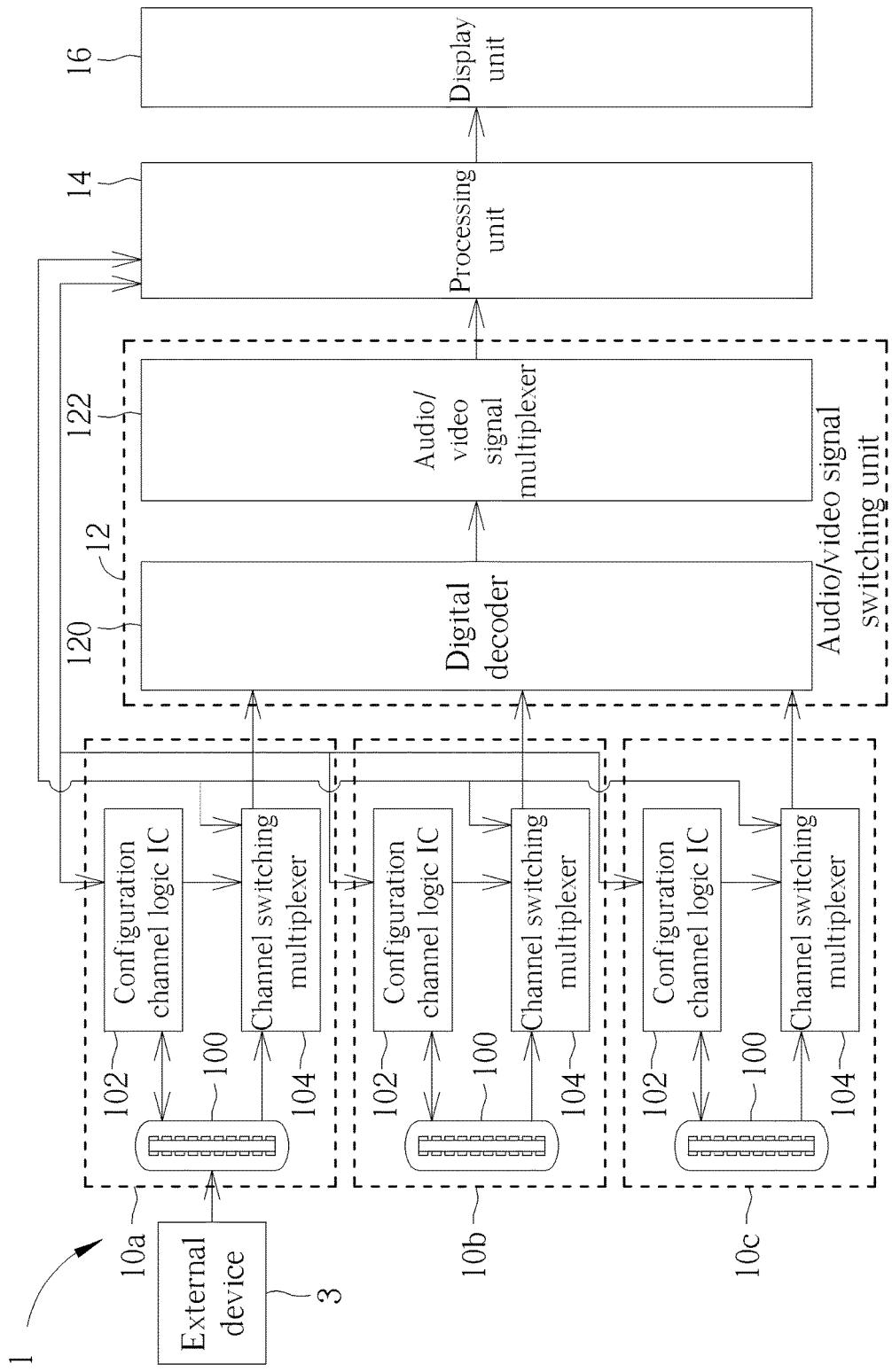
FIG. 1 is a functional block diagram illustrating a display device 1 according to an embodiment of the invention.

Referring to FIG. 1, FIG. 1 is a functional block diagram illustrating a display device 1 according to an embodiment of the invention. As shown in FIG. 1, the display device 1 comprises three USB Type-C connector modules 10a-10c, an audio/video signal switching unit 12, a processing unit 14, and a display unit 16. Each of the USB Type-C connector modules 10a-10c comprises a USB Type-C connector 100, a configuration channel logic IC 102, and a channel switching multiplexer 104, wherein the USB Type-C connector 100 is electrically connected to the configuration channel logic IC 102 and the channel switching multiplexer 104, and the configuration channel logic IC 102 is electrically connected to the channel switching multiplexer 104. The audio/video signal switching unit 12 is electrically connected to the channel switching multiplexer 104. The processing unit 14 is electrically connected to the configuration channel logic IC 102, the channel switching multiplexer 104, and the audio/video signal switching unit 12. The display unit 16 is electrically connected to the processing unit 14.

It should be noted that the display device 1 of the invention may be equipped with one or more USB Type-C connector modules according to practical applications, so the invention is not limited to the embodiment shown in FIG. 1. In this embodiment, the display device 1 may be a television or other electronic devices with display function. In practical applications, the processing unit 14 may be a processor or a controller with signal processing function (e.g. scalar IC); and the display unit 16 may be a liquid crystal display panel, a plasma display panel, an organic light emitting diode display panel or other display panels. In general, the display device 1 may be further equipped with some necessary hardware or software components for specific purposes, such as a power supply, an application, a communication module, a circuit board, an input/output port, etc., and it depends on practical applications. Furthermore, the audio/video signal switching unit 12 may comprise a digital decoder 120 and an audio/video signal multiplexer 122, wherein the digital decoder 120 is electrically connected to the channel switching multiplexer 104, and the audio/video signal multiplexer 122 is electrically connected to the digital decoder 120 and the processing unit 14.

Figure 2:
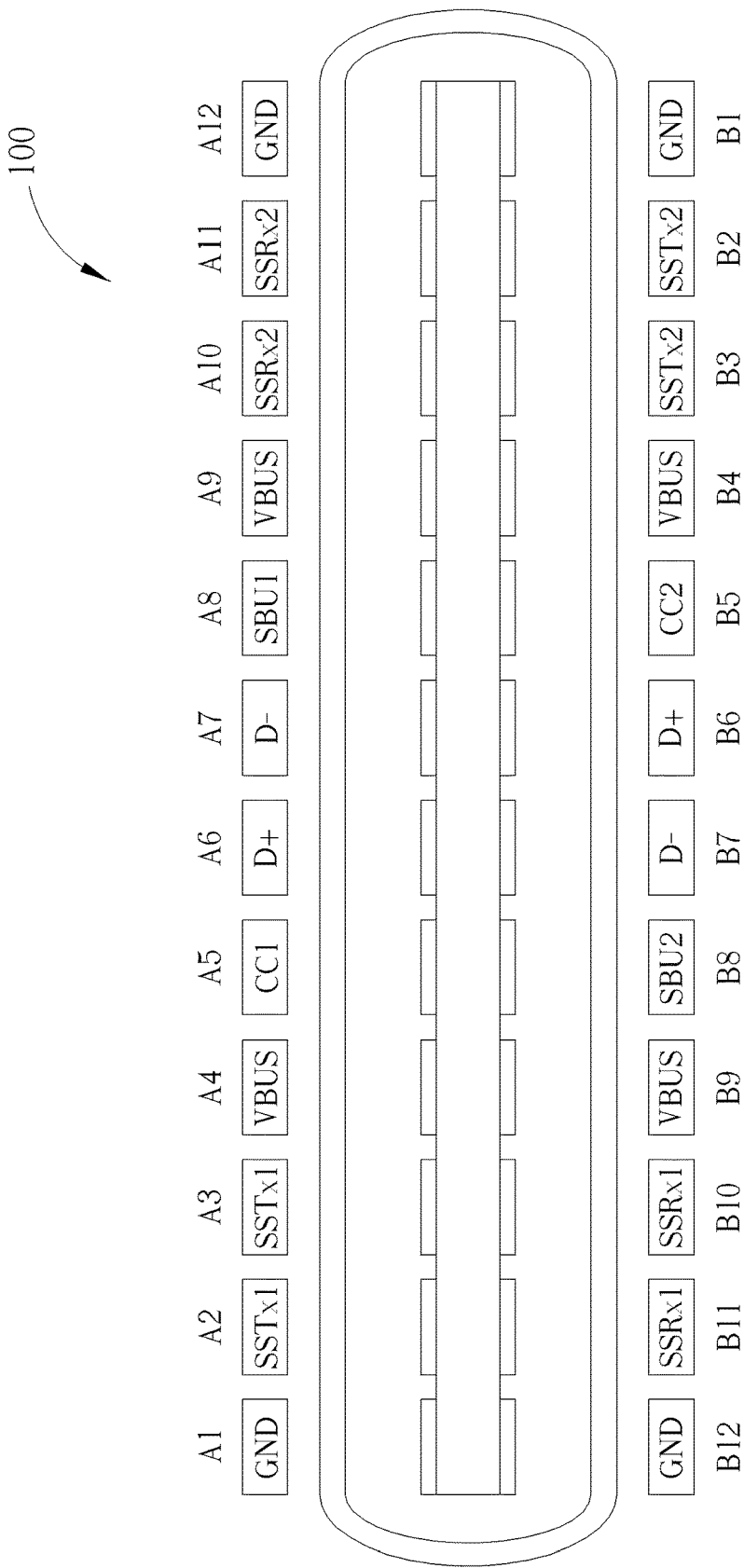
FIG. 2 is a schematic diagram illustrating the pins of the USB Type-C connector.

Referring to FIG. 2 and table 1, FIG. 2 is a schematic diagram illustrating the pins of the USB Type-C connector 100 and table 1 is a look-up table recording the pins of the USB Type-C connector 100 shown in FIG. 2.

TABLE 1

| Pin | Name | Description | Pin | Name | Description |
| --- | --- | --- | --- | --- | --- |
| A1 | GND | Ground return | B12 | GND | Ground return |
| A2 | SSTx1 | SuperSpeed differential pair #1, TX, positive | B11 | SSRx1 | SuperSpeed differential pair #2, RX, positive |
| A3 | SSTx1 | SuperSpeed differential pair #1, TX, negative | B10 | SSRx1 | SuperSpeed differential pair #2, RX, negative |
| A4 | VBUS | Bus power | B9 | VBUS | Bus power |
| A5 | CC1 | Configuration channel | B8 | SBU2 | Sideband use |
| A6 | D+ | Non-SuperSpeed differential pair, position 1, positive | B7 | D− | Non-SuperSpeed differential pair, position 2, negative |
| A7 | D− | Non-SuperSpeed differential pair, position 1, negative | B6 | D+ | Non-SuperSpeed differential pair, position 2, positive |
| A8 | SBU1 | Sideband use | B5 | CC2 | Configuration channel |
| A9 | VBUS | Bus power | B4 | VBUS | Bus power |
| A10 | SSRx2 | SuperSpeed differential pair #4, RX, negative | B3 | SSTx2 | SuperSpeed differential pair #3, TX, negative |
| A11 | SSRx2 | SuperSpeed differential pair #4, RX, positive | B2 | SSTx2 | SuperSpeed differential pair #3, TX, positive |
| A12 | GND | Ground return | B1 | GND | Ground return |

As shown in FIG. 2 and table 1, the USB Type-C connector 100 comprises two configuration channel (CC) pins CC1, CC2. The configuration channel logic IC 102 is electrically connected to the two configuration channel pins CC1, CC2. As shown in FIG. 1, when an external device 3 is connected to the USB Type-C connector 100 of the USB Type-C connector module 10a, the configuration channel logic IC 102 of the USB Type-C connector module 10a communicates with the external device 3 through one of the two configuration channel pins CC1, CC2, so as to determine a channel setting state. Then, the configuration channel logic IC 102 controls each pin of the USB Type-C connector 100 to perform functions correspondingly according to the channel setting state. It should be noted that the principle of each pin of the USB Type-C connector 100 is well known by one skilled in the art, so it will not be depicted herein.

Furthermore, the channel switching multiplexer 104 is used to switch transmitting/receiving channel for USB data or audio/video signal. The digital decoder is used to decode input digital image data and convert the digital image data into standard RGB or YUV signals. The audio/video signal multiplexer is used to switch input signal. The processing unit 14 may convert the input signal into specific signal format and resolution supported by the display unit 16.

Figure 3:
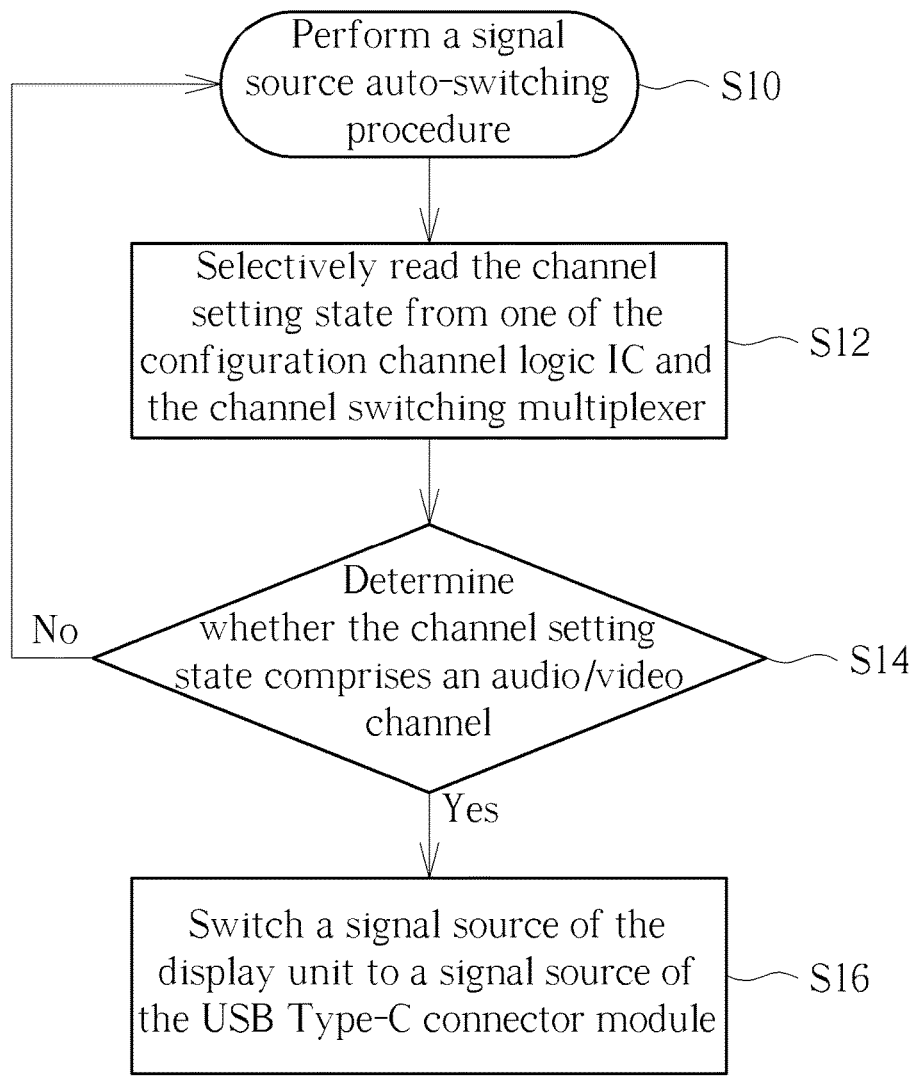
FIG. 3 is a flowchart illustrating a signal source switching method according to an embodiment of the invention.

Referring to FIG. 3, FIG. 3 is a flowchart illustrating a signal source switching method according to an embodiment of the invention. The signal source switching method shown in FIG. 3 can be implemented by the aforesaid display device 1. First of all, the processing unit 14 performs a signal source auto-switching procedure (step S10). After the configuration channel logic IC 102 determines the channel setting state, the processing unit 14 may selectively read the channel setting state from one of the configuration channel logic IC 102 and the channel switching multiplexer 104 (step S12). Then, the processing unit 14 determines whether the channel setting state comprises an audio/video channel (step S14). When the processing unit 14 determines that the channel setting state comprises the audio/video channel, the processing unit 14 controls the audio/video switching unit 12 to switch a signal source of the display unit 16 to a signal source of the USB Type-C connector 100 of the USB Type-C connector module 10*a* (step S16), wherein the signal source of the USB Type-C connector 100 of the USB Type-C connector module 10*a* is the external device 3. When the processing unit 14 determines that the channel setting state does not comprise the audio/video channel, go back to the signal source auto-switching procedure (step S10).

In step S12, the processing unit 14 may read the channel setting state from the configuration channel logic IC 102 after the configuration channel logic IC 102 determines the channel setting state. Furthermore, in step S12, the processing unit 14 may read the channel setting state from the channel switching multiplexer 104 after the configuration channel logic IC 102 determines the channel setting state and finishes setting the channel setting state in the channel switching multiplexer 104. In practical applications, the processing unit 14 may read the channel setting state from one of the configuration channel logic IC 102 and the channel switching multiplexer 104 through a specific interface, such as I2C, SPI, GPIO, and so on.

In this embodiment, since the display device 1 comprises a plurality of the USB Type-C connector modules 10*a*-10*c*, the processing unit 14 may poll the USB Type-C connector modules 10*a*-10*c* to control the audio/video switching unit 12 to switch the signal source of the display unit 16 to the signal source of one of the USB Type-C connector modules 10*a*-10*c*.

Figure 4:
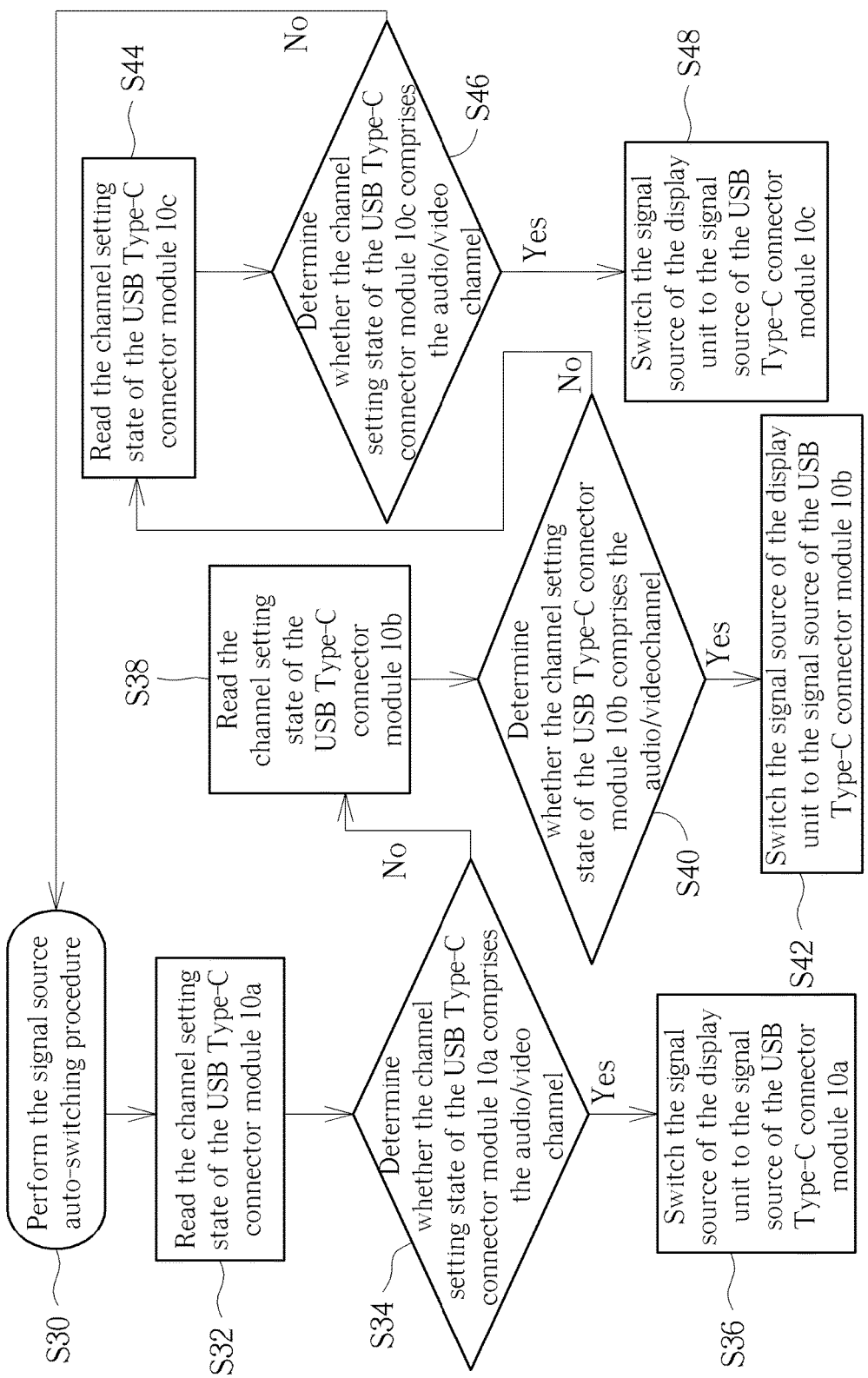
FIG. 4 is a flowchart illustrating a signal source switching method according to another embodiment of the invention.

Referring to FIG. 4, FIG. 4 is a flowchart illustrating a signal source switching method according to another embodiment of the invention. The signal source switching method shown in FIG. 4 can be implemented by the aforesaid display device 1. First of all, the processing unit 14 performs the signal source auto-switching procedure (step S30). Then, the processing unit 14 may read the channel setting state of the USB Type-C connector module 10*a* (step S32). Then, the processing unit 14 determines whether the channel setting state of the USB Type-C connector module 10*a* comprises the audio/video channel (step S34). When the processing unit 14 determines that the channel setting state of the USB Type-C connector module 10*a* comprises the audio/video channel, the processing unit 14 controls the audio/video switching unit 12 to switch the signal source of the display unit 16 to the signal source of the USB Type-C connector module 10*a* (step S36). When the processing unit 14 determines that the channel setting state of the USB Type-C connector module 10*a* does not comprise the audio/video channel, the processing unit 14 may read the channel setting state of the USB Type-C connector module 10*b* (step S38). Then, the processing unit 14 determines whether the channel setting state of the USB Type-C connector module 10*b* comprises the audio/video channel (step S40). When the processing unit 14 determines that the channel setting state of the USB Type-C connector module 10*b* comprises the audio/video channel, the processing unit 14 controls the audio/video switching unit 12 to switch the signal source of the display unit 16 to the signal source of the USB Type-C connector module 10*b* (step S42). When the processing unit 14 determines that the channel setting state of the USB Type-C connector module 10*b* does not comprise the audio/video channel, the processing unit 14 may read the channel setting state of the USB Type-C connector module 10*c* (step S44). Then, the processing unit 14 determines whether the channel setting state of the USB Type-C connector module 10*c* comprises the audio/video channel (step S46). When the processing unit 14 determines that the channel setting state of the USB Type-C connector module 10*c* comprises the audio/video channel, the processing unit 14 controls the audio/video switching unit 12 to switch the signal source of the display unit 16 to the signal source of the USB Type-C connector module 10*c* (step S48). When the processing unit 14 determines that the channel setting state of the USB Type-C connector module 10*c* does not comprise the audio/video channel, go back to the signal source auto-switching procedure (step S30).

Figure 5:
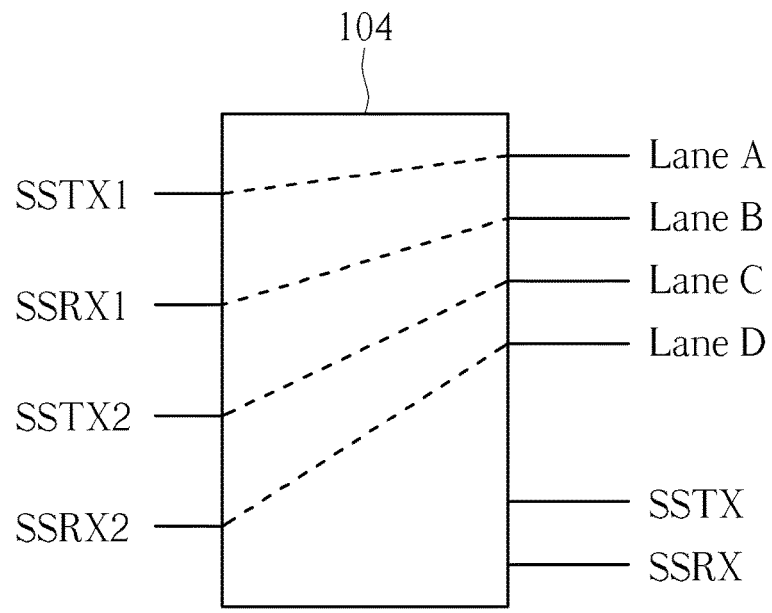
FIG. 5 is a schematic diagram illustrating the channel setting state of the channel switching multiplexer under C mode of the DP alt mode.
Figure 6:
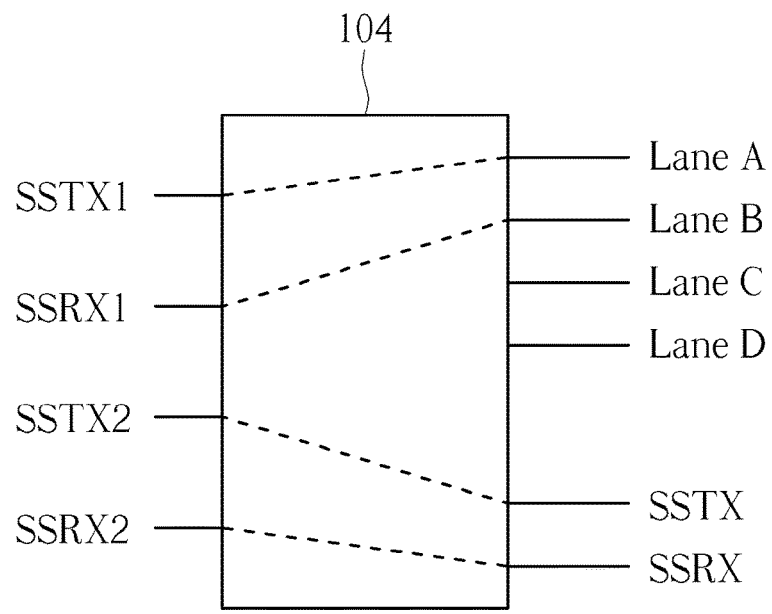
FIG. 6 is a schematic diagram illustrating the channel setting state of the channel switching multiplexer under D mode of the DP alt mode.

Referring to table 2, FIG. 5, and FIG. 6, table 2 is a look-up table of DP alternate mode (alt mode), FIG. 5 is a schematic diagram illustrating the channel setting state of the channel switching multiplexer 104 under C mode of the DP alt mode, and FIG. 6 is a schematic diagram illustrating the channel setting state of the channel switching multiplexer 104 under D mode of the DP alt mode. As shown in FIG. 5, under C mode of the DP alt mode, the channel switching multiplexer 104 utilizes four SSTX/SSRX channels and four lanes A-D to establish audio/video channels. As shown in FIG. 6, under D mode of the DP alt mode, the channel switching multiplexer 104 utilizes two SSTX/SSRX channels and two lanes A-B to establish audio/video channels and utilizes two SSTX/SSRX channels and another two SSTX/SSRX channels to establish data channels. Accordingly, under C or D mode of the DP alt mode, the processing unit 14 may determine that the channel setting state comprises the audio/video channel. It should be noted that, in addition to the DP alt mode, the invention may also be adapted to HDMI alt mode.

TABLE 2

| | Assignment | | | | |
|---|---|---|---|---|---|
| | A | B | C | D | E |
| | | | Cable | | |
| Receptacle Pin | USB Type-C to USB Type-C Adapter | USB Type-C to USB Type-C Adapter | USB Type-C to USB Type-C Adapter | USB Type-C to USB Type-C Adapter | Legacy DP to USB Type-C |
| | | | DisplayPort Signaling | | |
| number | GEN2_BR | GEN2_BR | DP_BR | DP_BR | DP_BR |
| A11/10 | ML0 | ML0 | ML1 | ML1 | ML3 |
| A2/3 | Open ML3 | SSTX | ML3 | SSTX | ML1 |
| B11/10 | ML1 | SSRX | ML2 | SSRX | ML0 |
| B2/3 | Open ML2 | Open ML1 | ML0 | ML0 | ML2 |
| A8 | AUX_N HPD | AUX_N HPD | AUX_N HPD | AUX_N HPD | AUX_P HPD |
| B8 | AUX_P HPD | AUX_P HPD | AUX_P HPD | AUX_P HPD | AUX_N HPD |

Figure 7:
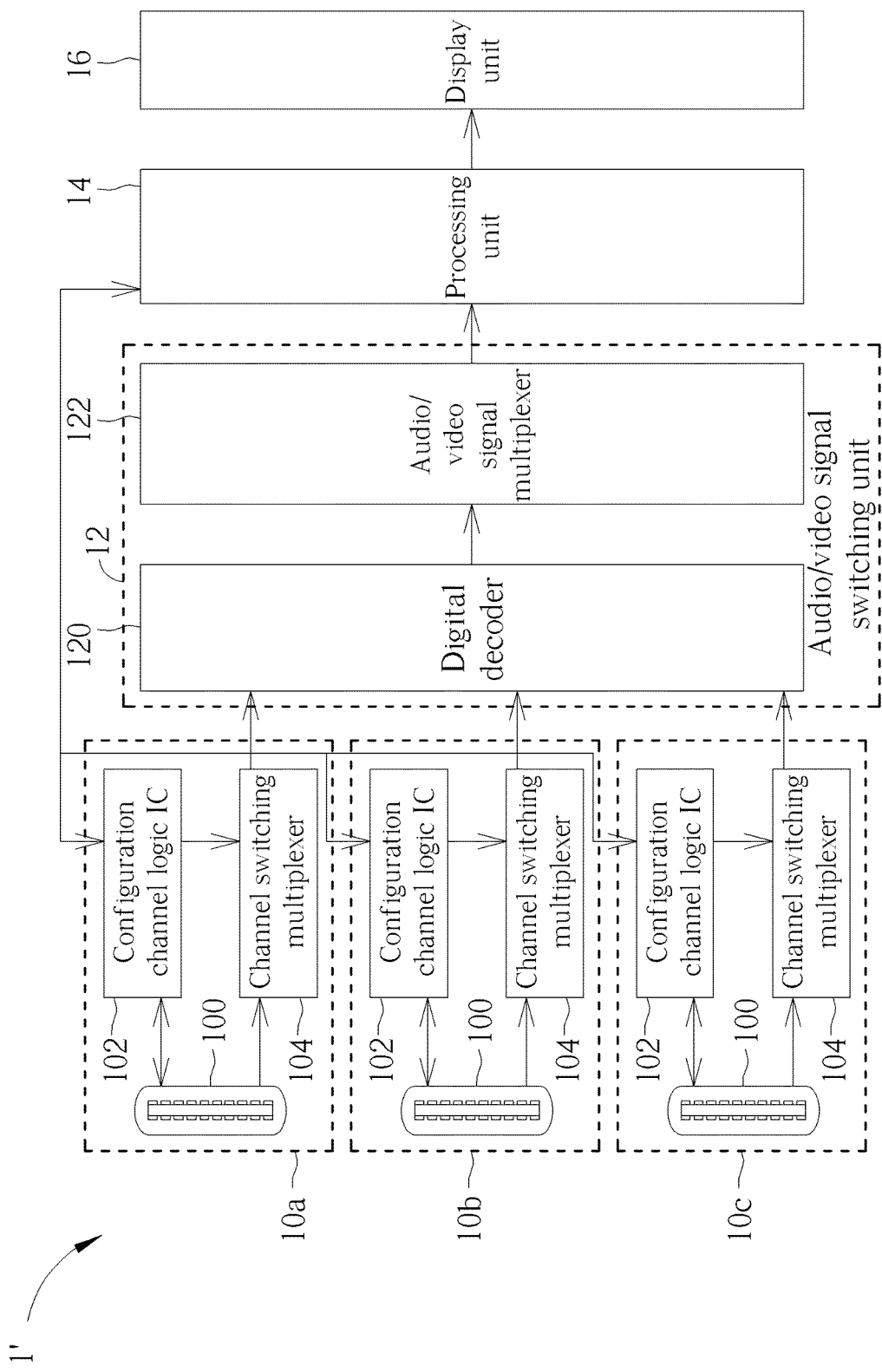
FIG. 7 is a functional block diagram illustrating a display device according to another embodiment of the invention.

Referring to FIG. 7, FIG. 7 is a functional block diagram illustrating a display device 1' according to another embodiment of the invention. The main difference between the display device 1' and the aforesaid display device 1 is that the processing unit 14 of the display device 1' is not electrically connected to the channel switching multiplexers 104 of the USB Type-C connector modules 10a-10c. Accordingly, when the aforesaid signal source auto-switching procedure is performed, the display device 1' reads the channel setting state from the configuration channel logic IC 102. It should be noted that the same elements in FIG. 7 and FIG. 1 are represented by the same numerals, so the repeated explanation will not be depicted herein again.

Figure 8:
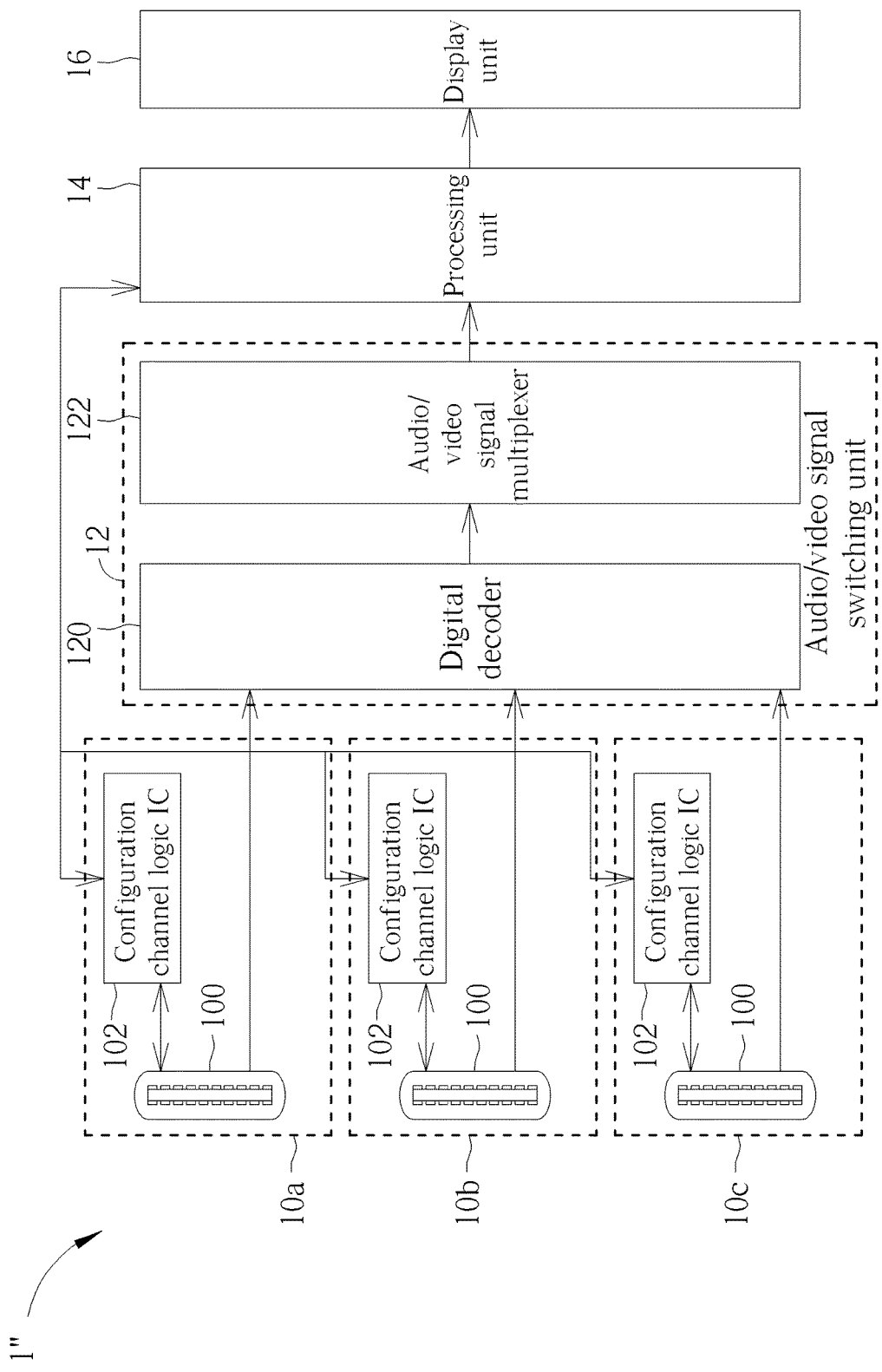
FIG. 8 is a functional block diagram illustrating a display device according to another embodiment of the invention.

Referring to FIG. 8, FIG. 8 is a functional block diagram illustrating a display device 1" according to another embodiment of the invention. The main difference between the display device 1' and the aforesaid display device 1 is that the USB Type-C connector modules 10a-10c of the display device 1" do not comprise the aforesaid channel switching multiplexer 104, wherein the audio/video signal switching unit 12 is electrically connected to the USB Type-C connector 100. Accordingly, when the aforesaid signal source auto-switching procedure is performed, the display device 1" reads the channel setting state from the configuration channel logic IC 102. It should be noted that the same elements in FIG. 8 and FIG. 1 are represented by the same numerals, so the repeated explanation will not be depicted herein again.

It should be noted that the display device of the invention may also comprise other input connectors with different signal formats, such as AV connector, S-Video connector, component video connector, VGA connector, DVI connector, HDMI connector, DP connector, and so on, and it depends upon practical applications.

As mentioned in the above, when an external device is connected to the USB Type-C connector of the display device, the configuration channel logic IC communicates with the external device through a configuration channel pin of the USB Type-C connector, so as to determine the channel setting state. The processing unit may selectively reads the channel setting state from one of the configuration channel logic IC and the channel switching multiplexer and determines whether the channel setting state comprises the audio/video channel. When the processing unit determines that the channel setting state comprises the audio/video channel, the processing unit controls the audio/video switching unit to switch the signal source of the display unit to the signal source of the USB Type-C connector module. Accordingly, the invention can switch the signal source easily and rapidly while the external device is connected to the USB Type-C connector of the display device and the audio/video channel is established.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display device comprising:
   a USB Type-C connector module comprising a USB Type-C connector, a configuration channel logic IC, and a channel switching multiplexer, the USB Type-C connector being electrically connected to the configuration channel logic IC and the channel switching multiplexer, the configuration channel logic IC being electrically connected to the channel switching multiplexer;
   an audio/video signal switching unit electrically connected to the channel switching multiplexer;
   a processing unit electrically connected to the configuration channel logic IC, the channel switching multiplexer, and the audio/video signal switching unit; and
   a display unit electrically connected to the processing unit;
   wherein the audio/video switching unit comprises a digital decoder and an audio/video signal multiplexer, the digital decoder is electrically connected to the channel switching multiplexer, the audio/video signal multiplexer is electrically connected to the digital decoder and the processing unit, the processing unit selectively reads a channel setting state from one of the configuration channel logic IC and the channel switching multiplexer and determines whether the channel setting state comprises an audio/video channel; when the processing unit determines that the channel setting state comprises the audio/video channel, the processing unit controls the audio/video switching unit to switch a signal source of the display unit to a signal source of the USB Type-C connector module.

2. The display device of claim 1, wherein the USB Type-C connector comprises two configuration channel pins and the configuration channel logic IC is electrically connected to the two configuration channel pins; when an external device is connected to the USB Type-C connector, the configuration channel logic IC communicates with the external device through one of the two configuration channel pins, so as to determine the channel setting state.

3. The display device of claim 1, comprising a plurality of the USB Type-C connector modules, the processing unit polling the USB Type-C connector modules to control the audio/video switching unit to switch the signal source of the display unit to the signal source of one of the USB Type-C connector modules.

4. A signal source switching method adapted to a display device, the display device comprising a plurality of USB Type-C connector modules, an audio/video signal switching unit, and a display unit, each of the USB Type-C connector modules comprising a USB Type-C connector, a configuration channel logic IC, and a channel switching multiplexer, the signal source switching method comprising steps of:
   polling the USB Type-C connector modules and selectively reading a channel setting state from one of the configuration channel logic IC and the channel switching multiplexer for each of the USB Type-C connector modules;
   determining whether the channel setting state comprises an audio/video channel; and
   when determining that the channel setting state comprises the audio/video channel, controlling the audio/video switching unit to switch a signal source of the display unit to a signal source of one of the USB Type-C connector modules.

5. The signal source switching method of claim 4, wherein the USB Type-C connector comprises two configuration channel pins and the configuration channel logic IC is electrically connected to the two configuration channel pins; when an external device is connected to the USB Type-C connector, the configuration channel logic IC communicates with the external device through one of the two configuration channel pins, so as to determine the channel setting state.

6. A display device comprising:
   a USB Type-C connector module comprising a USB Type-C connector and a configuration channel logic IC, the USB Type-C connector being electrically connected to the configuration channel logic IC;

an audio/video signal switching unit electrically connected to the USB Type-C connector;

a processing unit electrically connected to the configuration channel logic IC and the audio/video signal switching unit; and a display unit electrically connected to the processing unit;

wherein the audio/video switching unit comprises a digital decoder and an audio/video signal multiplexer, the digital decoder is electrically connected to the USB Type-C connector, the audio/video signal multiplexer is electrically connected to the digital decoder and the processing unit, the processing unit reads a channel setting state from the configuration channel logic IC and determines whether the channel setting state comprises an audio/video channel; when the processing unit determines that the channel setting state comprises the audio/video channel, the processing unit controls the audio/video switching unit to switch a signal source of the display unit to a signal source of the USB Type-C connector module.

7. The display device of claim 6, wherein the USB Type-C connector comprises two configuration channel pins and the configuration channel logic IC is electrically connected to the two configuration channel pins; when an external device is connected to the USB Type-C connector, the configuration channel logic IC communicates with the external device through one of the two configuration channel pins, so as to determine the channel setting state.

8. The display device of claim 6, comprising a plurality of the USB Type-C connector modules, the processing unit polling the USB Type-C connector modules to control the audio/video switching unit to switch the signal source of the display unit to the signal source of one of the USB Type-C connector modules.

9. A signal source switching method adapted to a display device, the display device comprising a plurality of USB Type-C connector modules, an audio/video signal switching unit, and a display unit, each of the USB Type-C connector modules comprising a USB Type-C connector and a configuration channel logic IC, the signal source switching method comprising steps of:

polling the USB Type-C connector modules and reading a channel setting state from the configuration channel logic IC for each of the USB Type-C connector modules;

determining whether the channel setting state comprises an audio/video channel; and when determining that the channel setting state comprises the audio/video channel, controlling the audio/video switching unit to switch a signal source of the display unit to a signal source of one of the USB Type-C connector modules.

10. The signal source switching method of claim 9, wherein the USB Type-C connector comprises two configuration channel pins and the configuration channel logic IC is electrically connected to the two configuration channel pins; when an external device is connected to the USB Type-C connector, the configuration channel logic IC communicates with the external device through one of the two configuration channel pins, so as to determine the channel setting state.

\* \* \* \* \*